United States Patent [19]

Yodoshi et al.

[11] Patent Number: 4,519,638
[45] Date of Patent: May 28, 1985

[54] PIPE JOINT

[75] Inventors: Tatsuo Yodoshi; Hiroyoshi Ohata; Hiroshi Inoue, all of Kawachinagano, Japan

[73] Assignee: Higashio Pipe Fittings Mfg. Co., Ltd., Osaka, Japan

[21] Appl. No.: 428,720

[22] Filed: Sep. 30, 1982

[30] Foreign Application Priority Data

Mar. 19, 1982 [JP] Japan ............................. 57-39631[U]
Apr. 15, 1982 [JP] Japan ............................. 57-55417[U]
Jun. 25, 1982 [JP] Japan ............................. 57-96102[U]

[51] Int. Cl.³ ............................................. F16L 37/00
[52] U.S. Cl. .................................... 285/305; 285/351; 285/382; 285/404
[58] Field of Search ............... 285/305, 308, 351, 317, 285/382, 314, 404

[56] References Cited

U.S. PATENT DOCUMENTS 1,949,883  3/1934  Sharp ........................... 285/404 X
3,422,630  1/1969  Marier .......................... 285/305 X
4,289,339  9/1981  Hansen ......................... 285/305

FOREIGN PATENT DOCUMENTS 1230857  5/1971  United Kingdom ............... 285/305

Primary Examiner—Dave W. Arola
Attorney, Agent, or Firm—Armstrong, Nikaido, Marmelstein & Kubovcik

[57] ABSTRACT

A pipe joint comprising a joint body provided with an insertion hole into which a pipe to be joined is inserted to be retained and a screw member adapted to engage with a fixing hole bored in the joint body and to form a recessed part on the outer periphery of the pipe by the engagement thereof with the joint body. Turning direction of the screw member conforms to pipe insertion direction. When joining two pipes together, a set of screw members for tightly fixing the pipes to the joint body respectively are provided in such an arrangement as perpendicular with each other. A boring member such as a drill is provided on the tip of the screw member so as to form the recessed part on the periphery of the pipe by cutting. The pipe insertion hole is adapted to comprise a diametrally large part formed on the opening side of the joint body and a diametrally small part continuous with the large part; a hollow cylindrical body whose inner diameter equal to the diameter of the small part is inserted into the diametrally large part; and an annular groove for inserting a sealing member is formed between the inward edge surface of the cylindrical body and a stepped boundary surface between the diametrally large part and diametrally small one.

5 Claims, 29 Drawing Figures

PIPE JOINT

This invention relates to a pipe joint for joining a pipe to the other member, for example, the other pipe.

As the known conventional ones, there are such pipe joints as shown in FIGS. 1 through 3. A pipe joint as shown in FIG. 1 is composed of a joint body 2 and taper pins 3, and functions to join two pipes 1 and 1' together in such manner that two pipes 1 and 1' are inserted into the joint body 2 and tightly fixed thereto with the aid of recesses on the outer periphery of the pipes 1 and 1' produced when said pins 3 are driven into holes 5 bored in the joint body 2. The reference numeral 4 indicates a sealing member for preventing leakage of fluid flowing through pipes 1 and 1'. Another pipe joint as shown in FIG. 2 is composed of a joint body 2 and screw members 6, and tightly fixes the pipe 1 thereto with the aid of recess produced on the periphery of the pipe 1 by engagement of the screw member 6 with the joint body 2. Still another pipe joint as shown in FIG. 3 is composed of a joint body 2, a cap nut 7 to be screwed on said joint body 2 which tightly fixes the pipe 1 to the joint body 2 with the aid of force generated by engagement of the cap nut 7 with the joint body 2 and pressing the ring 8 to the outer periphery of the pipe 1.

As described above, the known conventional pipe joints are various in kind, however, followed by drawbacks as will be described hereunder.

In the case of the pipe joint as shown in FIG. 1, slipping-off of the taper pin 3 from the hole 5, even if slight, extremely reduces fastening force of the joint. In the case of the joint as shown in FIG. 2, similarly to that in FIG. 1, slight slackness of the screw member 6 greatly reduces fastening force of the joint, and threads of the screw member 6 may possibly be damaged when said member 6 is too tightly fastened, since the driving direction of the screw member 6 is perpendicular with the outer periphery of the pipe 1. Moreover, a pressing area of the screw member 6 is small relative to the pipe 1 and, accordingly, the fastening force is weak. In the case of the joint as shown in FIG. 3, the structure of the device is so complex that the number of man-hour for the manufacture thereof as well as production cost increases. When the outer diameter of the pipe 1 is large (2 inches or above), a large torque is required for fastening the cap nut 7.

In the pipe joint as shown in FIG. 1, sealing members 4 and 4 are inserted into annular grooves provided on the surface of the joint proper 2 into which the pipes 1 and 1' are inserted. Width of said annular groove is made approximately equal to or slightly smaller than that of said sealing member 4 for obtaining a perfect sealing effect, and, as a result, when said sealing members 4 and 4 are pressed and deformed by the edges of pipes 1 and 1' inserted into said hole, spaces for receiving deformed parts of said sealing members are not left at all and consequent reactive force of sealing members acts to prevent insertion of the pipes 1 and 1', thereby requiring relatively strong force for pipe insertion, which, therefore, is a hard work to perform. Further, when said pipes 1 and 1' are not relieved from burrs produced at edges thereof during cutting, these burrs damage the sealing members 4 and 4 and affect sealing effect.

An object of this invention is to provide a pipe joing having highly strong fastening force and losing almost none thereof even if any loosening condition appears somewhat.

Another object of this invention is to provide a pipe joint having strong fastening force resistive to vibration transmitted from any of all directions.

Still another object of this invention is to provide a pipe joint permitting easy joining of pipes and being simple in structure as well as inexpensive.

Further object of this invention is to provide a pipe joint enabling smooth insertion of pipes with the application of relatively weak force by providing spaces for receiving sealing members pressed and deformed with pipe insertion, thereby completely eliminating possibility to damage sealing members for ensuring perfect sealing effect upon completion of joining operation.

These and other objects of this invention will become apparent from the following detailed description with reference to the appended drawings.

FIG. 1 includes sectional views of a conventional pipe joint, in which (a) is a sectional side view and (b) a sectional view taken along the line W—W in (a);

Figure 1A:
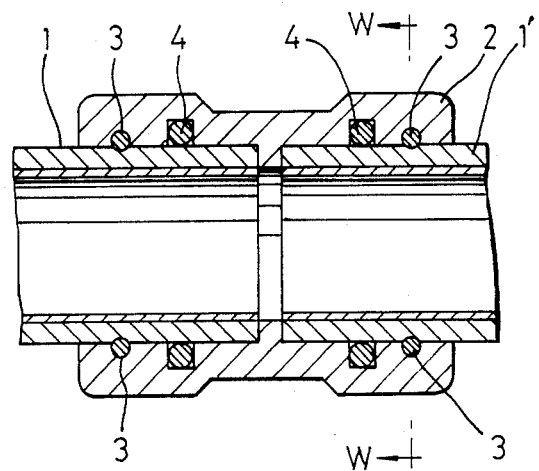
Figure 1B:
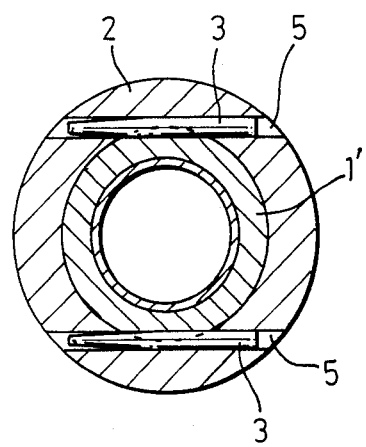

FIGS. 4 through 7 inclusive show a first embodiment of this invention, wherein the reference numeral 9 indicates a joint body provided with an insertion hole 17 for retaining a first pipe 1 inserted, another hole 18 for a second pipe 1', and an annular rib 9a on the border part between the insertion holes 17 and 18. The inner diameters of insertion holes 17 and 18 are made slightly larger than the outer diameters of the 1st and the 2nd pipes 1 and 1', respectively. Annular grooves 15 and 16 into which sealing members 4 and 4 are inserted each are provided on the surfaces of insertion holes 17 and 18, respectively. The reference numerals 19 and 20 indicate anti-corrosive packings for preventing corrosion of edge surfaces of the 1st and the 2nd pipes 1 and 1', respectively, and composing anti-corrosive members of pipes in association with anti-corrosive lining or coating 12 applied to the inner surfaces of the 1st and the 2nd pipes 1 and 1'. The numerals 10 and 11 represent a first and a second screw members for fixing the joint body 9 to the 1st pipe 1 and the 2nd pipe 1', respectively. These screw members 10 and 11 are parallel screws, preferably tapping ones, which are threaded so that turning directions C thereof agree with insertion directions D of the pipes 1 and 1'. The numerals 13 and 14 indicate threaded holes to engage with screw members 10 and 11, respectively, and bored in positions so as to pass through some portions on the outer peripheries of the 1st and the 2nd pipes 1 and 1', in an arrangement that all holes are parallel with each other and screw members are driven in the same direction for improving operation efficiency. As a general rule, the surfaces of these holes 13 and 14 are threaded for screw engagement with screw members 10 and 11, however, there may be a case that, when tapping screws are used, the diameters of holes 13 and 14 are made slightly smaller than the outer diameters of the screw members 10 and 11 without forming threads. The reference numerals 13a and 14a indicate the stopping surfaces for receiving the heads of the 1st and the 2nd screw members 10 and 11, respectively.

Figure 10:
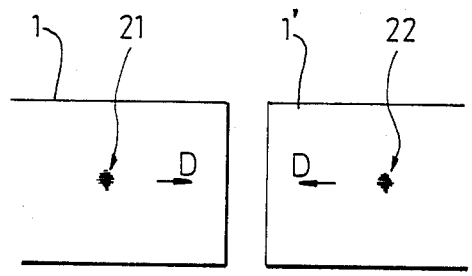
FIG. 10 is a plan view of recesses produced on the outer periphery of pipes by said screw means.

In the structure as described above, anti-corrosive packings 19 and 20 are inserted into the insertion holes 17 and 18, respectively, so as to abut on the rib 9a, and, after the insertion of sealing members 4 and 4 into the annular grooves 15 and 16, the 1st pipe 1 and the 2nd one 1' are inserted into the insertion holes 17 and 18, respectively, one end of each of said pipes being adapted to be in tight contact with each of said anti-corrosive packings 19 and 20. Then, the 1st and the 2nd screw members 10 and 11 are driven into the holes 13 and 14, respectively. With the progress of engaging action of the screw members 10 and 11, the outer peripheries of pipes 1 and 1' are gradually threaded at approximately elliptical areas thereon indicated as threaded recesses 21 and 22 as shown in FIG. 10, whereby the pipes 1 and 1' are tightly fixed to the joint body 9 with the screw members 10 and 11 so that the 1st pipe 1 and 2nd one 1' are joined together through the pipe joint. In this process, when the screw members 10 and 11 are adapted to engage with the joint while said pipes 1 and 1' are pushed through the insertion holes 17 and 18 along pipe insertion directions D, namely, directions toward a joining point of two pipes, smooth insertion of pipes 1 and 1' as well as improved tight contact of the pipe end with the anti-corrosive packings is obtained because turning directions C of the screw members 10 and 11 agree with said pipe insertion directions D, thereby perfect sealing effect being provided. In addition, each of said recessed parts 21 and 22 comprising a plurality of parallelly arranged internal threads saves the force for driving the screw.

Figure 8:
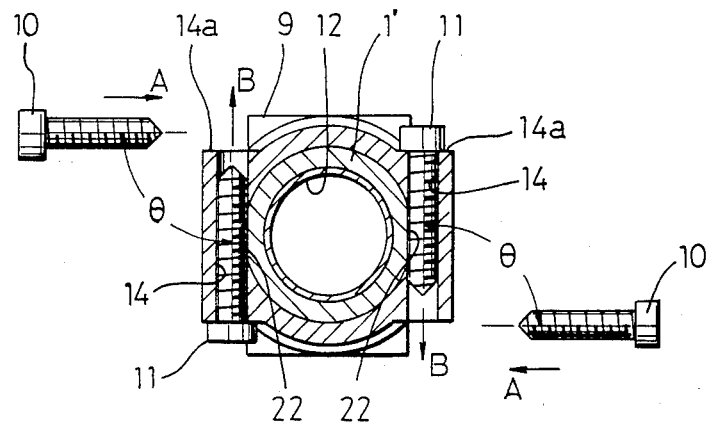
FIG. 8 is a sectional view of a second embodiment of this invention corresponding to the illustration in FIG. 5.

FIG. 8 shows a second embodiment of this invention, in which advancing directions A and A of the parallelly disposed 1st two screw members 10 and 10, as well as B and B of the 2nd screw members 11 and 11, are made opposite to each other differently from those in the previous embodiment which are the same each other, and the advancing direction A of the screw member 10 is adapted to intersect with that B of the screw member 11 with angular phase lag θ of 90°. In this embodiment, too, threads of the screw members 10 and 11 are formed so that the turning directions C of said members 10 and 11 agree with the pipe insertion directions D in the same way as those in the previous embodiment. Although the 1st two screw members 10 and 10 parallelly disposed top and bottom are left-hand screw and right-hand one respectively in the previous embodiment, those in this embodiment are all left-hand ones. This arrangement is also applicable to the 2nd screw members 11 and 11.

In the 1st and the 2nd embodiments, two pieces of screws 10 and 10 and those 11 and 11 are used as a 1st set and a 2nd one, respectively, however, a single piece of screw may suffice according to the use and size of pipes 1 and 1' to be joined together. A joint comprising a joint body 9 provided with pipe insertion holes 17 and 18 different from each other in diametral size is effective for joining diametrally different pipes 1 and 1' because of adaptability thereof to a wide variety of diameter.

Figure 3:
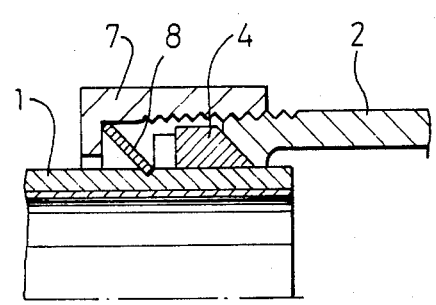
Figure 4:
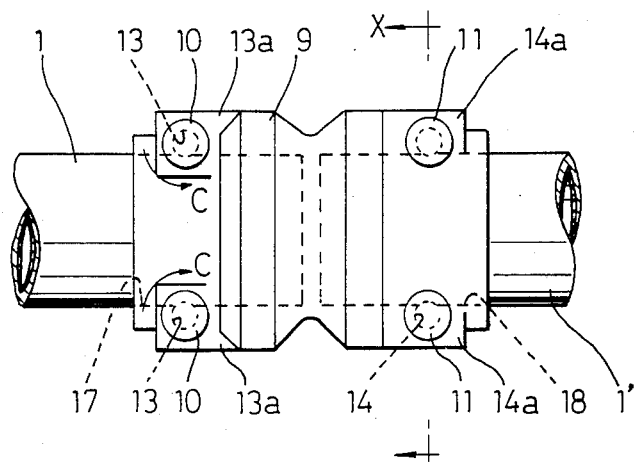
FIG. 4 is a side view of a first embodiment of this invention.
Figure 5:
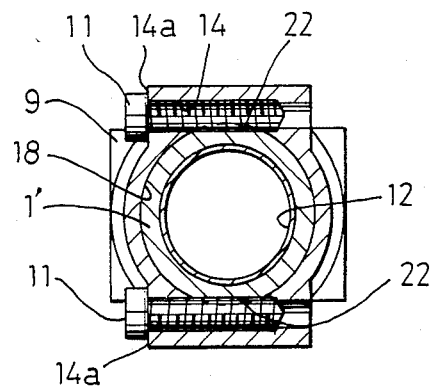
FIG. 5 is a sectional view thereof taken along the arrow line X—X in FIG. 4.
Figure 6:
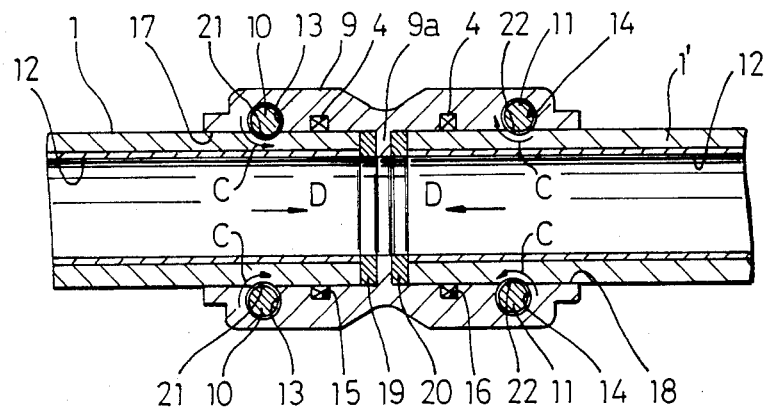
FIG. 6 is a sectional side view of said embodiment.
Figure 7:
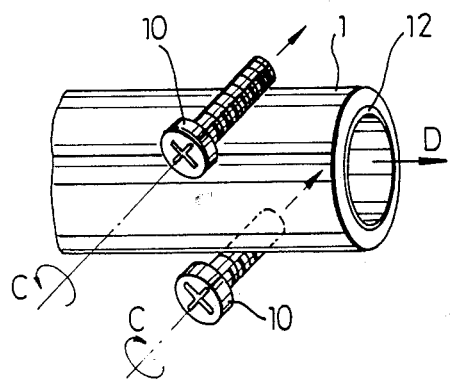
FIG. 7 is a perspective view illustrating a screw means of said embodiment.
Figure 9:
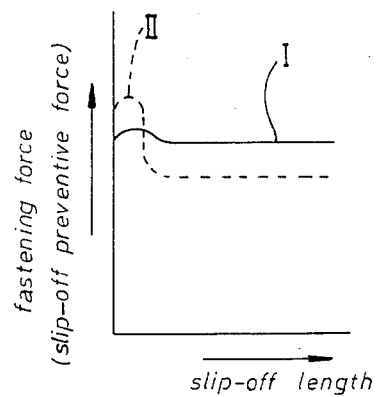
FIG. 9 is a diagram showing a comparison of a pipe joint according to this invention with conventional one with respect to fastening force (slip-off preventive force) and slip-off length.

When parallel screws are used as screw members to be adapted to engage with threaded holes in the joint body and to form internally threaded recessed parts on the outer peripheries of pipes while driven into the joint body for tightly fixing said joint body to said pipes as performed in the 1st and the 2nd embodiments, the fastening force (slip-off preventive force) of the joint is increased by more deepened engagement of said parallel screws with the pipe body and consequent enlarged pressing area; and even if said pipe slips off the sitting position thereof in the joint body, decrease in fastening force scarcely occur in the embodiment of this invention as shown (by the continuous line I) in FIG. 9, thereby fastening force far more stable than that in the conventional pipe joint being exercised (as shown by the dotted line). Incidentally, the conventional pipe joint referred to for comparison is of such structure as shown in FIG. 3. In the embodiment of this invention, even when the screw member is loosened and slightly slips off the threaded hole, fastening force is scarcely affected. Since the driving direction of the screw member is tangential with the outer periphery of the pipe, fastening force for the screw member is not required to be so strong and, even if strong force is applied to said member, threads thereof are not damaged. In addition, the recessed part having internal threads with which the screw member engages and formed in an elliptic area as shown in FIG. 10 saves the force for driving the screw member. When the turning directions of screw members are adapted to agree with the pipe insertion directions, the force for turning said screw members exerts influence upon the pipe peripheries and permits smoother insertion of pipes into the joint in combination with the other effect of the force for pushing pipes, thereby dispensing with special jigs for pipe insertion even when pipes of a large diameter are handled. The embodiment is so simple in structure that the number of man-hour as well as cost for production is kept low.

An angular difference θ in driving direction between the 1st and the 2nd screw members set at 90° as shown in FIG. 8 compensates weak fastening force against vibration transmitted from a specific direction, which is intrinsic in conventional screw members, and provides strong force resistive to vibration including torsion from any direction.

Figure 11:
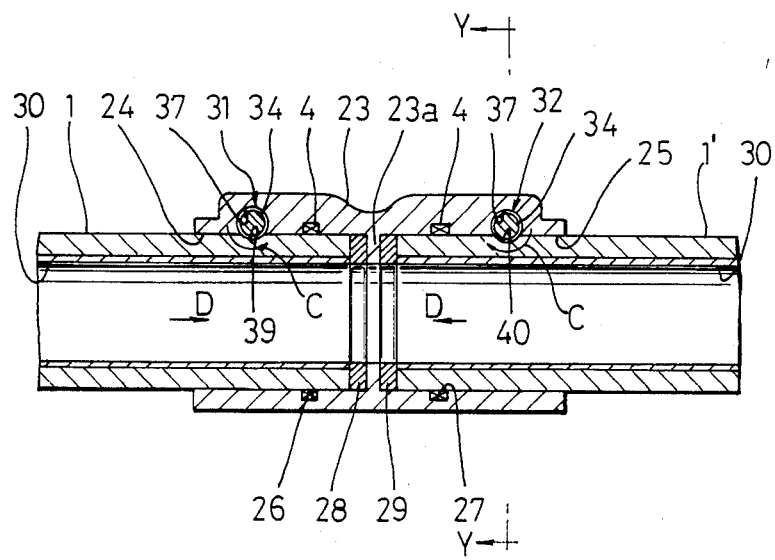
FIG. 11 is a sectional side view of a third embodiment of this invention.
Figure 12:
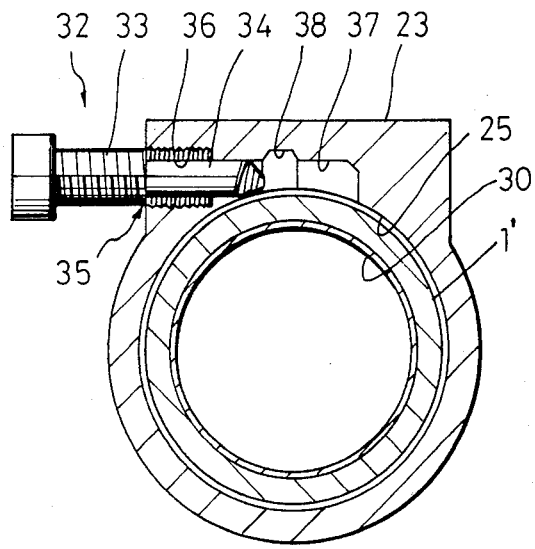
FIGS. 12 and 13 are sectional views taken along the line Y—Y in FIG. 11, the former showing an incomplete engagement of the screw member with the joint whereas the latter a complete one.
Figure 13:
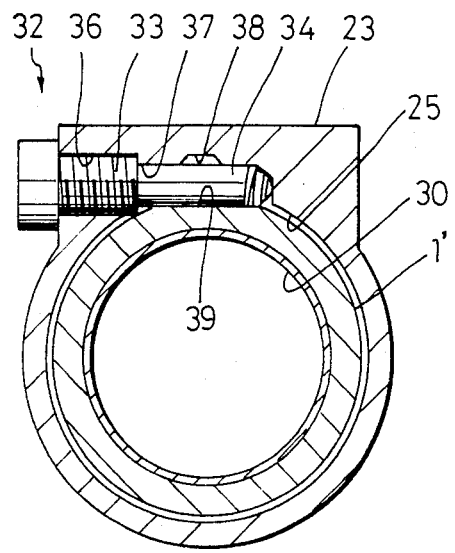

FIGS. 11 through 13 are views of a third embodiment of this invention, in which a joint body indicated as 23 is provided with insertion holes 24 and 25 bored therethrough for retaining pipes 1 and 1' as well as with an annular rib 23a on the border between said two holes 24 and 25. The diameters of insertion holes 24 and 25 are made somewhat larger than the outer diameters of pipes 1 and 1'. Annular grooves 26 and 27 into which the sealing members 4 and 4 are inserted are provided on the surface of insertion holes 24 and 25. The numerals 28 and 29 represent an anti-corrosive packing for preventing corrosion of edge surfaces of pipes 1 and 1', composing anti-corrosive members for preventing corrosion of pipes 1 and 1' in association with anti-corrosive lining or coating 30 applied onto the inner surfaces of pipes 1 and 1'. The numerals 31 and 32 indicate screw members for fixing a joint body 23 to pipes 1 and 1'. Each of these screw members 31 and 32 comprises a screw threaded part 33 and a recess-forming part 34 formed at the end of said screw threaded part 33 as shown in FIGS. 12 and 13. Said recess-forming part 34 comprises a boring means such as a tapping screw, drill, etc., the diameter thereof being slightly smaller than that of the screw threaded part 33. The numeral 35 indicates holes, into which screw members 31 and 32 are driven, each comprising an internally threaded part 36 to be engaged with screw threaded part 33 of any of screw members 31 and 32 and a hole part 37 through which the recess-forming part 34 is thrusted. Said hole 35 is bored in such a position that the hole part 37 thereof passes through a part of the outer peripheral body of any of pipes 1 and 1'. The diameter of the hole part 37 of said hole 35 is preferably made equal to or somewhat smaller than the outer diameter of the recess-forming part 34 of screw members 31 and 32. The numeral 38 stands for an escape space into which chips produced during formation of recess 39 or 40 escape.

In such a structure as above, anti-corrosive packings 28 and 29 are inserted into insertion holes 24 and 25 of the joint body 23 until abutting the rib 23a, the sealing members 4 and 4 are inserted into annular grooves 26 and 27, and then the pipes 1 and 1' are inserted into said insertion holes 24 and 25 of the joint so that the ends thereof come into tight contact with anti-corrosive packings 28 and 29. The screw members 31 and 32 are driven into holes 35 and 35 with the progress of engaging action of screw threaded parts 33 and 33 of these screw members 31 and 32 with the internally threaded parts 36 and 36, and the recess-forming parts 34 and 34 advance through the hole parts 37 and 37 while sliding on or cutting the surfaces of said hole parts 37 and 37, thereby producing recesses 39 and 40 on the outer peripheries of pipes 1 and 1'. As a result, the pipes 1 and 1' are tightly fixed to the joint body 23 through the screw members 31 and 32 and thus joined together through the joint.

Figure 14:
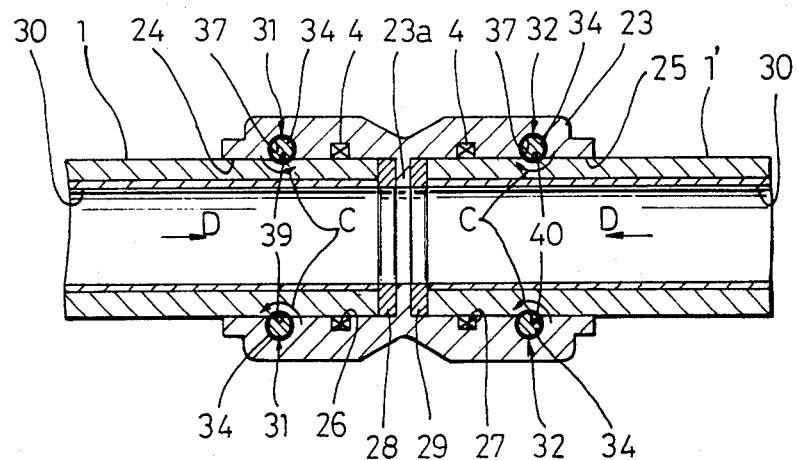
FIG. 14 is a sectional side view of a fourth embodiment of this invention.

A fourth embodiment of this invention is shown in FIG. 14, in which two pieces of screw members 31 as well as another two 32 as used in the 3rd embodiment are used and adapted to fixedly clamp the pipes 1 and 1'. In this way, the fastening force is strengthened higher than that in the 3rd embodiment.

Figure 2:
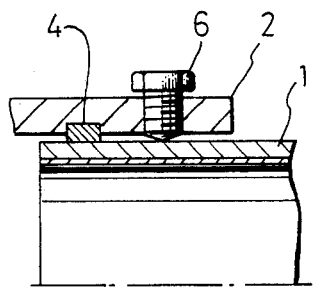
FIGS. 2 and 3 are sectional side views of other conventional pipe joints different from each other in kind.
Figure 15:
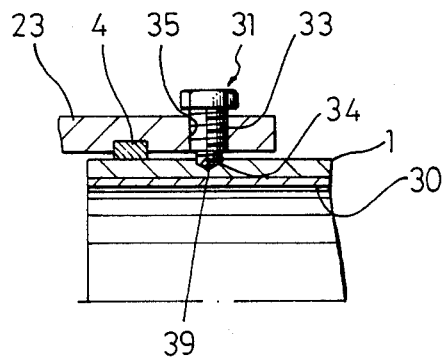
FIG. 15 is a sectional side view of a fifth embodiment of this invention.
Figure 16:
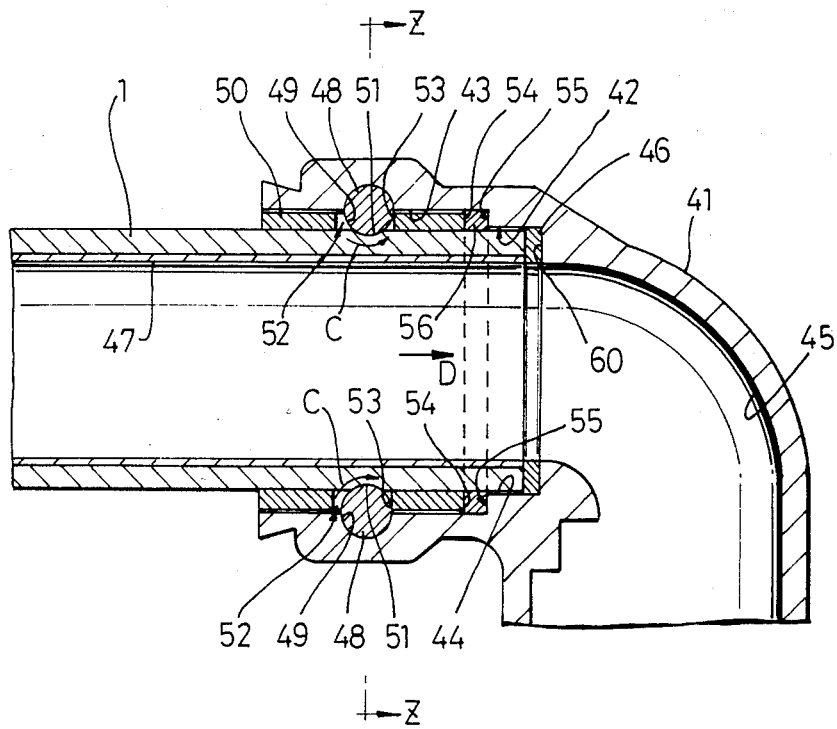
FIG. 16 is a sectional side view of a sixth embodiment of this invention.

A fifth embodiment of this invention is shown in FIG. 15, in which the screw member 31 is in the same structure as that used in the 3rd and 4th embodiment but short in length only and used as a substitute for the screw member 6 used in the conventional joint as shown in FIG. 2. In this embodiment, since the formation of recessed part 39 depends on cutting by means of the recess-forming part 34 differently from simple pressing action by engagement of the screw members with the pipe periphery in the conventional joint, the depth of the recessed part 39 is deep and strong force is not required for recess formation.

In the embodiments, the 3rd through the 5th, the recess-forming part may optionally be shaped like an ordinary drill throughout the body thereof, be provided with a cutting blade at the tip portion thereof, or preferably be provided with an implanted cutting tip. These embodiments are favored with easiness in insertion operation of pipes 1 and 1' which is endowed by adapting the turning directions C of the screw members 31 and 32 to conform to the insertion directions of pipes 1 and 1'. Also, it is preferable to provide an angular phase difference set at 90° between driving directions of the screw members 31 and 32 so that flexing deformation of the pipe joining part is made rather easy for prevention of breakage of the pipe joint.

As performed in the 3rd embodiment through the 5th one, by providing the tip portion of the threaded part of the screw member, which is adapted to engage with a threaded hole in the joint body and to form a recessed part on the outer periphery of the pipe while thus adapted to engage for fixing said joint body to said pipe, with a recess-forming part composed of a drilling member for forming said recessed part, the fastening force (slip-off preventive force) of the joint is strengthened and the pressing area is enlarged by deepened engagement of said screw member with the pipe body, whereby the pipe scarcely slips off the sitting position in said joint body and decrease in fastening force is hardly observed even when slight slipping of the pipe appears, exhibiting the fastening force far more stable than that in conventional pipe joints. Further, even when said screw member is loosened and slightly slips off the threaded hole, almost no influence is inflicted on the fastening force. Recess-formation depending on cutting saves the turning force for the screw member and makes easy the joining operation. A simple structure of this embodiment also saves man-hour and cost for production.

FIGS. 16 through 21 as well as FIGS. 23 through 26 show the sixth embodiment of this invention, in which the reference numeral 41 represents a joint proper provided with a hole 42 bored therethrough for retaining a pipe 1. The pipe insertion hole 42 comprises a large diameter part 43 and a small diameter one 44, the former 43 being open to the outside of the joint body 41 whereas the latter communicating with a connecting hole 45 having the diameter equal to the inner diameter of the pipe 1. The diameter of the samll hole 44 is made slightly larger than the outer diameter of the pipe 1. An anti-corrosive packing for preventing corrosion of the edge of the pipe 1 is indicated as 46 and composes an anti-corrosive member for the pipe 1 in association with anti-corrosive lining or coating 47 applied to the inner surface of the pipe 1.

The numeral 48 designates a screw member for fixing the joint body 41 to the pipe 1, and, concretely speaking, a parallel screw. This parallel screw 48 is preferably a tapping screw whose screw threads are formed so that the turning direction C thereof conforms to the pipe insertion direction D. Therefore, in the case of the embodiment shown in the drawing, two screw members 48 disposed top and bottom are all right-hand screws.

The numeral 49 indicates a threaded hole, with which the screw member 48 engages, positioned so as to pass through an outer peripheral part of the pipe 1. With the screw members 48 and 48 engaging with the threaded holes 49 and 49, recesses 51 and 51 are formed on the periphery of the pipe 1. The surface of the hole 49 is threaded for screw engagement with the screw member 48 as a rule, however, in some case when the tapping screw is used, the diameter of this hole is made slightly smaller than the outer diameter of the screw member 48 without formation of threads.

Figure 17:
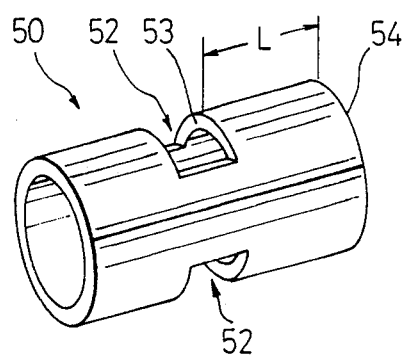
FIG. 17 is a perspective view of a hollow cylindrical body thereof.
Figure 18:
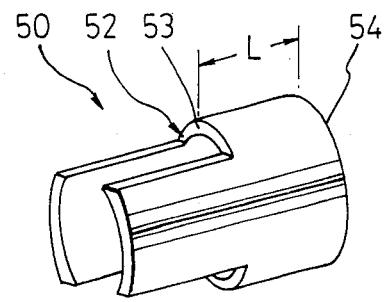
FIGS. 18 through 20 are perspective views of hollow cylindrical bodies as other embodiments.
Figure 20:
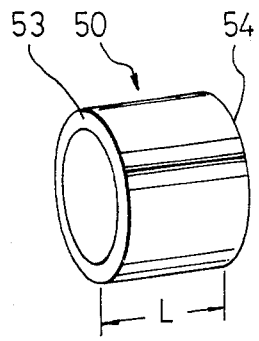
Figure 21:
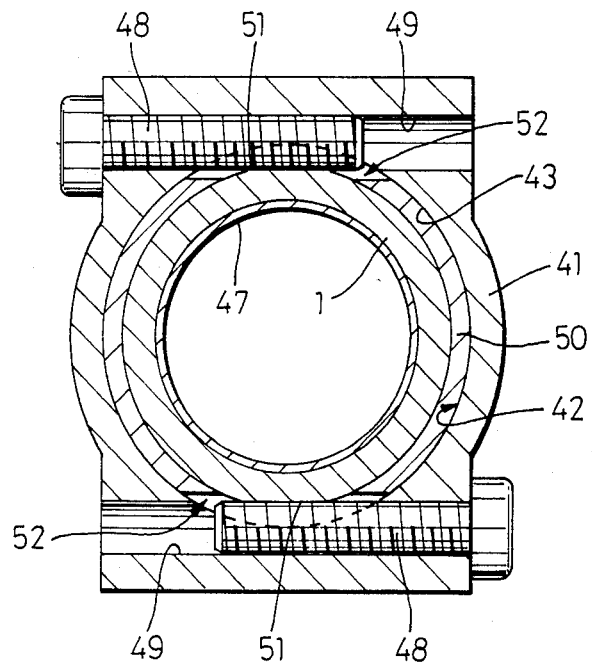
FIG. 21 is a sectional view taken along the line Z—Z in FIG. 16.

The numeral 50 indicates a hollow cylindrical body interposed between the surface of the diametrally large part 43 of the insertion hole 42 and the outer periphery of the pipe 1, the outer diameter of said body being made slightly smaller than the diameter of said large hole 43 whereas the inner diameter equal to the diameter of said small hole 44. Two cutouts 52 and 52 are provided in symmetrically opposing top and bottom positions on the periphery of the hollow cylindrical body as shown in FIG. 17, through which bottom parts of the screw members 48 pass when the pipe and the joint are fixed to each other. The length L extending between the inward edge 53 of said cutout 52 and that 54 of the hollow cylindrical body 50 is fixed so that, when the joint and the pipe are joined together, a length between the inward edge 54 of said cylindrical body 50 and the stepped boundary surface 55 between the large diameter part 43 and the small one 44 is made approximately equal to or slightly smaller than the width l (see FIG. 23) of the sealing member 56. An annular groove into which said sealing member 56 is inserted is provided between the inward edge 54 of said hollow cylindrical body 50 and said stepped boundary surface 55. The shape of the hollow cylindrical body 50 may be as shown in FIGS. 18 and 20 so long as the above conditions are satisfied. In other words, a cylindrical body 50 shown in FIG. 18 is provided with cutouts 52 extending to the outward edge thereof whereas that in FIG. 20 is so sized lengthwise as to be equal to L without cutouts. The hollow cylindrical body 50 as shown in FIG. 20 requires less man-hour for production, and therefore, saves cost as well as material when compared to that as shown in FIG. 17.

Figure 23:
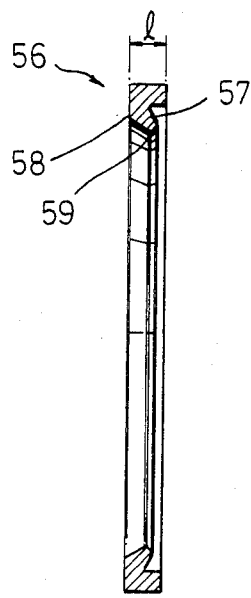
FIG. 23 is a sectional side view of a sealing member.

A sealing member 56 is interposed, while thrusted, between the surface of the insertion hole 42 of the joint body, namely, the surface of the diametrally large hole 43, and the outer periphery of the pipe 1 for tightly sealing the joint and the pipe, which is composed of an annular resilient body having a sectional shape as shown in FIG. 23. The inner periphery of the sealing member 56 is provided with an annular tongue-like edge protruding inwardly, the inner diameter of the base part 58 of said tongue-like edge 57 and that of the tip part 59 thereof being approximately equal to and smaller than the outer diameter of the pipe, respectively. The tongue-like edge 57 touches the outer periphery of the pipe 1 resiliently and compressingly when the joint and the pipe 1 are joined together.

Figure 25:
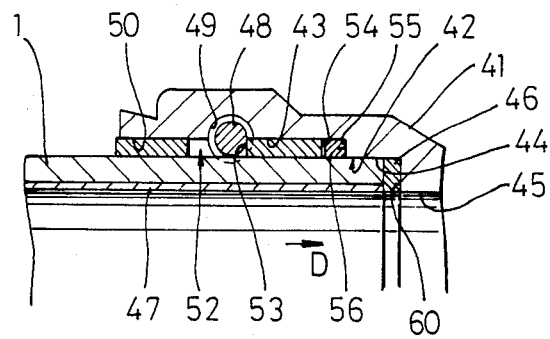
Figure 26:
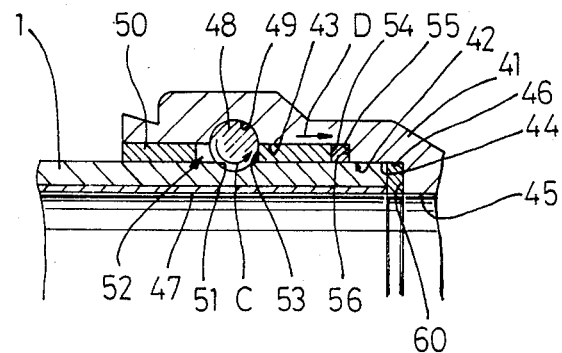

Now, referring to FIGS. 24 through 26, a description will be made on the process of joining the pipe 1 to the joint.

Figure 24:
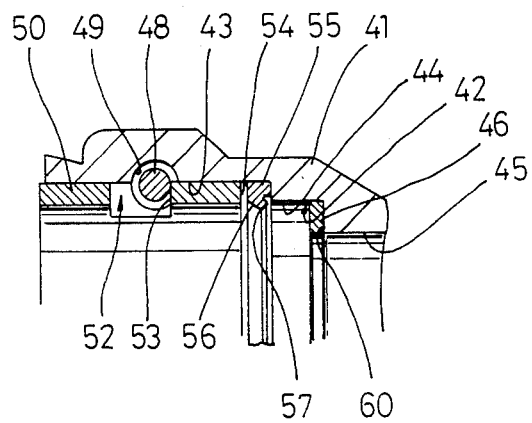
FIGS. 24 through 26 are sectional side views illustrating steps to join pipes together.

As shown in FIG. 24, an anti-corrosive packing 46 is inserted into the insertion hole 42 of the joint body 41 so as to be brought into contact with the surface 60 of the stepped boundary between the diametrally small hole 44 and the connecting hole 45, and then the sealing member 56 is inserted into the insertion hole 42 so as to be brought into contact with the stepped boundary surface 55. Subsequently, the hollow cylindrical body is inserted into the diametrally large part 43 of the insertion hole 42 and then the screw members 48 and 48 are driven into the threaded holes 49 and 49 in the joint body to some depth as a presetting procedure. In such a state as above, the inward edge 53 of the cutout 52 on the cylindrical body 50 abuts on the peripheral tip surface of the screw member 48 and the length between the inward edge 54 of the cylindrical body 50 and the stepped boundary surface 55 is larger than the width l of the sealing member 56, thereby sealing member 56 being in an idle state. Then, the pipe 1 is inserted into the diametrally small part 44 of the insertion hole 42 through the hollow cylindrical body 50 so that the distal end thereof is in tight contact with the anti-corrosive packing 46 (see FIG. 25). At this time, the tongue-like edge 57 of the sealing member 56 is deformed and pressed outwardly by the outer periphery of the pipe 1 and the width l of the sealing member 56 is enlarged by pressing force generated by the pipe, however, said sealing member 56 in idle state as described above is provided with an escape space therefor and, further, deformed to be larger in width without subjected to resistance, whereby the reactive force resulting from the above-said deformation, that is, the force to prevent the pipe insertion, is so extremely weak that the pipe insertion is made easy. When the screw member 48 pre-set as above in the threaded hole 49 is further screwed into the joint proper, the outer periphery of the pipe 1 is threaded by said screw as shown in FIG. 26 and provided with recessed part 51. At the same time, the hollow cylindrical body 50 whose cutout 52 is pressed inwardly in the direction D at the inward edge thereof slides on the surface of the diametrally large hole 43 and the outer periphery of the pipe 1. The pipe 1 is fixed to the joint proper 41 through the screw member 48 and the sealing member 56 is firmly held as if clamped between the inward edge surface 54 of the cylindrical body 50 and the stepped boundary surface 55. In this case, when the screw member 48 is turned while the pipe is thrusted in the insertion direction D through the insertion hole 42, the turning direction C of the screw member 48 agrees with the insertion direction D of the pipe 1 and said turning force exerts influence upon the outer periphery of the pipe 1, thereby permitting easy pipe insertion and facilitating tight contact of the end of the pipe with the anti-corrosive packing 46 which provides perfect sealing effect. The recessed part 51 comprises a plurality of parallelly running internal threads, which saves the force for driving the screw member.

Figure 27:
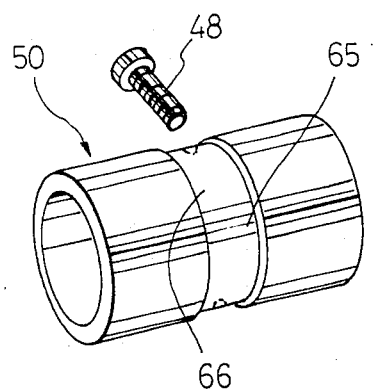
FIG. 27 is a perspective view of an eighth embodiment of this invention.
Figure 28:
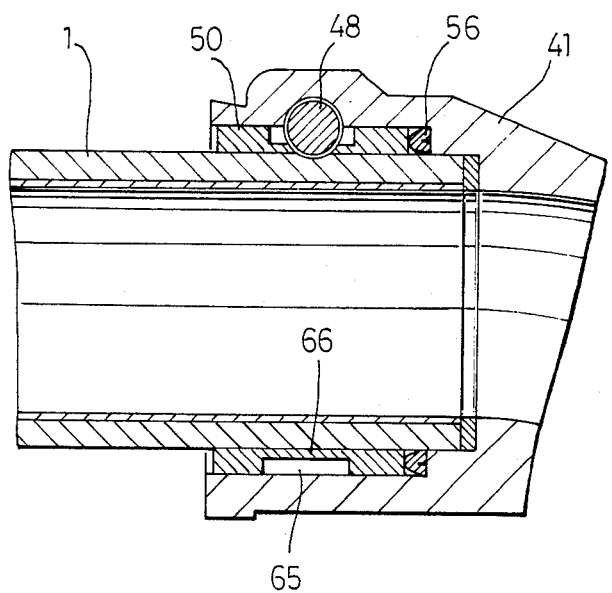
FIG. 28 is a sectional side view thereof.

In the embodiment as shown in FIGS. 27 and 28, the hollow cylindrical body 50 is made of a material easy to cut such as plastics or gun metal; a recessed part 65 is formed on the middle portion of the outer periphery of said body in a position corresponding to the driven-into screw member 48 for providing a thin wall part 66 of said body; and said thin wall part 66 is cut together with the periphery of the pipe 1 so as to retain the sealing member 56 and to complete joining of the pipe to the joint.

Figure 19:
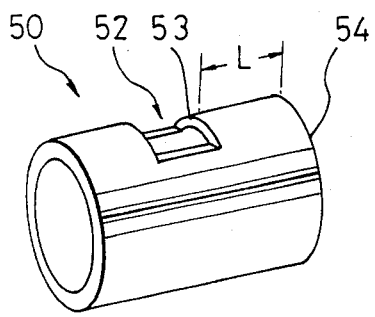
Figure 22:
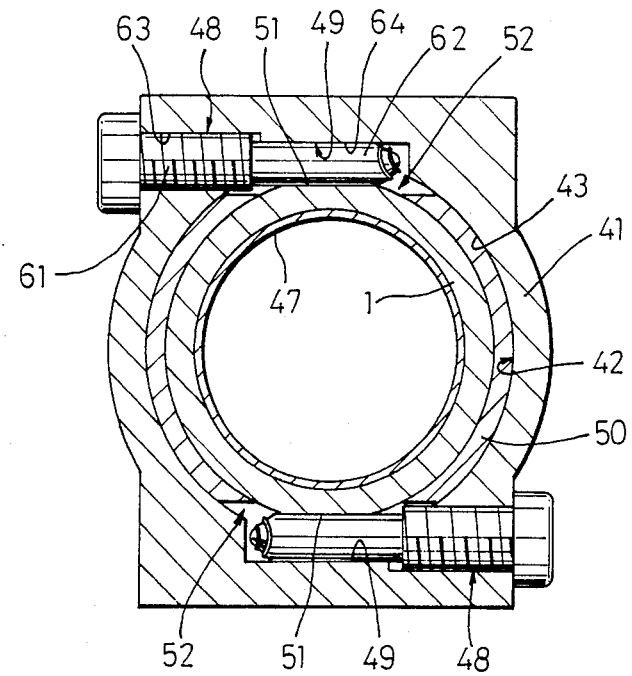
FIG. 22 is a sectional view of a seventh embodiment of this invention corresponding to the illustration in FIG. 21.

In the 6th embodiment as described above, two pieces of screw members 48 and 48 disposed top and bottom may be substituted by a single one in the same way as those in the previous embodiments according to the use and size of the pipe 1. In this case, the number of cutout 52 to be provided on the hollow cylindrical body is one as shown in FIG. 19. In the above embodiment, parallel screws are used as screw members 48 and 48, and a structure as shown in FIG. 22 is also applicable. That is to say, in FIG. 22, the screw member 48 comprises a screw threaded part 61 and a recess-forming part 62 provided on the tip portion of said screw threaded part 61. The recess-forming part 62 is composed of a boring means, for example, a drill and the outer diameter of said recess-forming part 62 is made slightly smaller than that of the screw threaded part 61.

Correspondingly to this structure, a screw threaded hole 49 is composed of an internally threaded part 63 to engage with the screw threaded part 61 and a hole part 64 through which the recess-forming part 62 is passed. The recess-forming part 62 may optionally be shaped like an ordinary drill throughout the entire body thereof, be provided with a cutting blade at the tip thereof only, or preferably provided with an implanted cutting tip thereof. In this way, when the tip portion of the screw member 62 is provided with a recess-forming part comprising a cutting means, the recessed part 51 produced on the periphery of the pipe 1 saves the force for turning the screw member 48. A sealing member 56 is not limited to the one as shown in FIG. 23 and may be modified as far as exhibiting the same function as that of the one shown therein, for example, an O-ring sold on the market. A structural configuration of the joint proper is not limited to L as used in the above embodiment and adaptable to any variation in piping arrangement. A shape of the hollow cylindrical body 50 is not limited to that shown in the drawing as far as retaining the same function as that in the embodiment referred to.

As shown by the 6th through 8th embodiments, a structure, which comprises a pipe insertion hole of the joint proper composed of a diametrally large part and a small one, a hollow cylindrical body having the internal diameter equal to that of said diametrally small part and inserted into said diametrally large part, and an annular groove for receiving a sealing member to be inserted therein formed between the inward edge of said hollow cylindrical body and the stepped boundary surface lying between said diametrally large part and the small one, provides an escape space for receiving a part of said sealing member deformed when the pipe is inserted into said insertion hole, reduces the insertion-preventive force generated due to repulsive action of the deformed sealing member, and enables smooth insertion operation with the application of relatively weak force. Thanks to the escape space as above, even when burrs produced at the time of pipe cutting are present at the pipe end, said sealing member smoothly escapes into said escape space with the insertion of pipe into the insertion hole and is never damaged by said burrs, exhibiting a perfect sealing effect at the time of completion of joining operation. Particularly, a constant degree of deformation of a resilient sealing member specific to this structure neither causes fluid leakage which occur in conventional box-nut type joints due to insufficient fastening of screws nor inflicts damage arising from over-fastening on the sealing member, thereby improving sealing effect significantly.

What is claimed is:

1. A pipe joint comprising, in combination with a pipe to be joined,:
    a joint body provided with a pipe insertion bore, said pipe insertion bore having a large diameter portion open at one end to the outside of said joint body and having a diameter greater than the outer diameter of said pipe to be joined, and a small diameter portion inwardly of said large diameter portion communicating with a connecting bore of said joint body and having a diameter equal to the outer diameter of said pipe to be joined, a first annular step being formed between said large and small diameter portions, and a second annular step being formed between said small diameter portion and said connecting bore;
    a hollow cylindrical body defined by cylindrical walls provided with means to allow communication through said walls and having an inner diameter equal to the diameter of said small diameter portion of said pipe insertion bore, inserted in said large diameter portion of said pipe insertion bore so as to define an annular groove between an inner end of said hollow cylindrical body and said first annular step;
    an annular resilient sealing member interposed in said annular groove for tightly sealing between said pipe insertion bore and an outer periphery of said pipe to be joined when said pipe is joined therein;
    annular packing means disposed in said small diameter portion of said pipe insertion bore between said second annular step and a distal end of said pipe to be joined when said pipe is inserted in said pipe insertion bore;
    at least one fixing hole formed in said joint body tangentially of said large diameter portion of said pipe insertion bore, an inner side portion of said fixing hole opening into said large diameter portion; and
    screw means adapted to engage with said fixing hole and to pass through said means in said wall to form recesses in an outer periphery of said pipe to be joined,
    whereby said pipe to be joined may be inserted through said inner diameter of said hollow cylindrical body and into said small diameter portion of said pipe insertion bore and said screw means engaged in said fixing hole, means in said wall and said recesses thereby formed in said pipe in order to join said pipe to said joint body.

2. A pipe joint according to claim 1 wherein said means on said hollow cylindrical body is formed intermediate its ends and includes symmetric cutout wall portions through which said screw means may pass, said cutout wall portions being arranged such that an inwardly extending axial portion of said hollow cylindrical body is tightly disposed between said screw means and said sealing member when said pipe is joined to said joint body.

3. A pipe joint according to claim 1 wherein said means on said hollow cylindrical body is formed at one of its ends and includes symmetric cutout wall portions through which said screw means may pass, said cutout wall portions being arranged such that another end portion of said hollow cylindrical body is tightly disposed between said screw means and said sealing member when said pipe is joined to said joint body.

4. A pipe joint according to claim 1 wherein said hollow cylindrical body is formed of an easily cut material and said means thereon is provided intermediate its ends and includes an annular recessed peripheral portion such that said screw means may be engaged in said fixing hole and form recesses in said outer periphery of said pipe to be joined through said recessed peripheral portion of said hollow cylindrical body when said pipe is joined to said joint body.

5. A pipe joint according to any of claims 1, 2, 3 or 4 wherein said screw means have a turning direction for engagement in conformity with a direction of insertion of said pipe to be joined into said joint body.

* * * * *